United States Patent
Kanai et al.

(10) Patent No.: US 8,013,973 B2
(45) Date of Patent: Sep. 6, 2011

(54) METHOD FOR MANUFACTURING LIQUID CRYSTAL DISPLAY DEVICE WITH SCRIBING GROOVE

(75) Inventors: Masahide Kanai, Kanagawa (JP); Takeshi Nishi, Kanagawa (JP)

(73) Assignee: Semiconductor Energy Laboratory Co., Ltd., Atsugi-shi, Kanagawa-ken ( * ) Notice: Subject to any disclaimer, the term of this patent is extended or adjusted under 35 U.S.C. 154(b) by 597 days.

(21) Appl. No.: 12/149,010

(22) Filed: Apr. 24, 2008

(65) Prior Publication Data

US 2008/0268738 A1 Oct. 30, 2008

(30) Foreign Application Priority Data

Apr. 27, 2007 (JP) ................................. 2007-119324

(51) Int. Cl.
*G02F 1/1339* (2006.01)
*G02F 1/1341* (2006.01)

(52) U.S. Cl. ......... 349/190; 349/153; 349/154; 349/189

(58) Field of Classification Search .......... 349/153–154, 349/189–190, 158
See application file for complete search history.

(56) References Cited

U.S. PATENT DOCUMENTS

| 4,691,995 | A | | 9/1987 | Yamazaki et al. | |
|---|---|---|---|---|---|
| 5,684,556 | A | * | 11/1997 | Shimamune | 349/158 |
| 5,936,695 | A | * | 8/1999 | Hida et al. | 349/153 |
| 6,195,149 | B1 | * | 2/2001 | Kodera et al. | 349/187 |
| 6,297,869 | B1 | * | 10/2001 | Choo et al. | 349/187 |
| 6,975,380 | B2 | | 12/2005 | Eguchi et al. | |
| 2004/0017537 | A1 | * | 1/2004 | Magana et al. | 349/187 |
| 2004/0155085 | A1 | | 8/2004 | Takamatsu et al. | |
| 2004/0233374 | A1 | * | 11/2004 | Yamazaki et al. | 349/153 |
| 2006/0066724 | A1 | | 3/2006 | Eguchi et al. | |

* cited by examiner

*Primary Examiner* — Hoan C Nguyen
(74) *Attorney, Agent, or Firm* — Eric J. Robinson; Robinson Intellectual Property Law Office, P.C.

(57) ABSTRACT

It is an object to prevent disordered orientation of liquid crystal molecules which is due to division of substrates even when a liquid crystal dripping method is used, and to provide a method for manufacturing a liquid crystal display device in which liquid crystal is not adversely affected even when a sealant not cured and liquid crystal are in contact. In a method for manufacturing a liquid crystal display device using a liquid crystal dripping method, a scribe groove is provided for at least one of a pair of substrates with a diamond cutter or the like before the pair of substrates are attached under reduced pressure. After the scribing, the pair of substrates are attached under reduced pressure, heat treatment for curing the sealant and aligning the liquid crystal molecules is performed, and the substrates are divided by applying impact using a breaking apparatus.

6 Claims, 7 Drawing Sheets

METHOD FOR MANUFACTURING LIQUID CRYSTAL DISPLAY DEVICE WITH SCRIBING GROOVE

BACKGROUND OF THE INVENTION

1. Field of the Invention

The present invention relates to a method for manufacturing a liquid crystal display device. For example, the present invention relates to a method for manufacturing an electro-optical device typified by a liquid crystal display panel having a circuit using a thin film transistor (hereinafter, a TFT) and a method for manufacturing an electronic device provided with such an electro-optical device as a component.

2. Description of the Related Art

In recent years, attention has focused on a technique for forming a thin film transistor (TFT) by using a semiconductor thin film (having a thickness of approximately several nanometers to several hundreds of nanometers) formed over a substrate having an insulating surface. Thin film transistors are widely applied to electronic devices such as ICs and electro-optical devices, and in particular, their rapid development as switching elements for image display devices is desired.

A liquid crystal display device is known as an example of the image display devices. Compared to passive matrix liquid crystal display devices, high-definition images can be obtained with active matrix liquid crystal display devices; therefore, the active matrix liquid crystal display devices have become widely used. In the active matrix liquid crystal display devices, when pixel electrodes arranged in matrix are driven, a display pattern is formed on a screen. In more detail, when voltage is applied between a selected pixel electrode and a counter electrode that corresponds to the selected pixel electrode, a liquid crystal layer provided between the pixel electrode and the counter electrode is optically modulated, and this optical modulation is recognized as a display pattern by a viewer.

The application range of such active matrix electro-optical devices is expanding, and demands for high-definition, a higher aperture ratio, and high reliability are increasing as a screen size gets larger. At the same time, demands for improvement in productivity and cost reduction are increasing.

The cost for materials is increased as the size of the panel gets larger. In particular, a liquid crystal material provided between a pixel electrode and a counter electrode is expensive.

In the case of using a liquid crystal injection method, sealing of liquid crystal requires a complex process such as drawing of a sealant, attachment of a counter substrate, division of substrates, injection of liquid crystal, and sealing of an inlet for injecting liquid crystal. In particular, as a panel size gets larger, it becomes difficult to fill a region surrounded by the sealant (including at least a pixel portion) with liquid crystal since liquid crystal is injected using a capillary phenomenon. When liquid crystal is injected using a capillary phenomenon, a larger amount of liquid crystal than that to be injected from the liquid crystal inlet is used in vain.

Further, when a liquid crystal injection method is used, two substrates are attached to each other and divided, and then, a liquid crystal material is injected from a liquid crystal inlet formed on the divided surface. At this time, a path of the liquid crystal material extending from the liquid crystal inlet to a pixel portion is also filled with the liquid crystal. Further, when a driver circuit portion and a pixel portion are provided over one substrate, not only the pixel portion but also a region overlapping with the driver circuit portion is filled with the liquid crystal in some cases. In such a manner, a region except the region to be a display portion is also filled with the liquid crystal material.

In addition, an extremely large amount of liquid crystal flows in the path of the liquid crystal material extending from the liquid crystal inlet to the pixel portion especially around the liquid crystal inlet, compared to other portions in the panel. Therefore, there is a concern that around the inlet, the surface of an alignment film is changed due to friction caused by injecting the liquid crystal, and orientation of liquid crystal molecules is disordered as a result.

Further, in a liquid crystal injection method, a step of sealing the liquid crystal inlet is necessary after the liquid crystal injection.

The present applicant propose a technique of attaching a pair of substrates to each other under reduced pressure after dripping liquid crystal in Reference 1 (U.S. Pat. No. 4,691,995).

SUMMARY OF THE INVENTION

The technique disclosed in Reference 1 is called a liquid crystal dripping method (ODF: one drop fill). A liquid crystal dripping method can eliminate the loss of materials because only a necessary amount of liquid crystal is dripped to a necessary portion. Since a seal pattern has a closed loop shape, a seal pattern for a liquid crystal inlet and a path is not necessary. Accordingly, defects caused at the time of liquid crystal injection (such as defective orientation) can be eliminated.

A liquid crystal dripping method is greatly different from a liquid crystal injection method in the order of steps.

Manufacturing steps of a liquid crystal display device using a liquid crystal injection method will be described. First, a sealant is drawn on a counter substrate by a screen printing method or using a dispenser apparatus. Next, the counter substrate is attached to another substrate, and the both substrates are bonded to each other by curing the sealant with heat press. Then, the pair of substrates are divided so that part of the sealant (a liquid crystal inlet) is positioned at the edge of the substrate. After that, the pair of substrates are disposed in a chamber under reduced pressure, the pressure in the chamber is made to return gradually from the reduced pressure to the atmospheric pressure with a liquid crystal material being in contact with the liquid crystal inlet, so that the liquid crystal material is injected from the liquid crystal inlet using a capillary phenomenon. The liquid crystal inlet is sealed with a sealing material, and the sealing material is cured by being irradiated with ultraviolet light. Finally, heat treatment is performed to align the liquid crystal molecules.

Manufacturing steps of a liquid crystal display device using a liquid crystal dripping method will be described. First, a sealant having a closed pattern is drawn on a counter substrate using a dispenser apparatus. Next, only a desired amount of liquid crystal is dripped to a region surrounded by the sealant of the counter substrate. The counter substrate is attached to another substrate under reduced pressure. An atmosphere around the pair of substrates is changed from the reduced pressure to the atmospheric pressure. The sealant is cured by being irradiated with ultraviolet light. Then, heat treatment for further curing the sealant and heat treatment for aligning the liquid crystal molecules are performed at the same time. Finally, the pair of substrates are divided.

In a liquid crystal injection method, the pair of substrates are bonded to each other by heat press and divided, and then, the liquid crystal is injected. In a liquid crystal dripping method, the liquid crystal is dripped to the substrate, and then, the pair of substrates are attached to each other under reduced pressure and divided.

It is necessary to perform heat treatment to align the liquid crystal molecules. In a liquid crystal injection method, heat treatment is performed to align the liquid crystal molecules after curing the sealing material. In a liquid crystal dripping method, heat treatment for curing the sealant and heat treatment for aligning the liquid crystal molecules are performed at the same time, whereby a liquid crystal display device is efficiently manufactured.

However, when a liquid crystal dripping method is used, the orientation of the liquid crystal molecules is disordered by division of the substrates, which results in lower image quality of the liquid crystal display device. Therefore, it is an object of the present invention to prevent the orientation of the liquid crystal molecules from being disordered due to division of the substrates even if a liquid crystal dripping method is used.

In addition, in order to achieve improvement in productivity and low cost of a liquid crystal display device, it is preferable to manufacture a plurality of panels from one substrate which is 1 m on one side for mass production.

The present invention provides a method for manufacturing a plurality of liquid crystal display devices efficiently from one large-area substrate having a size of, for example, 320 mm×400 mm, 370 mm×470 mm, 550 mm×650 mm, 600 mm×720 mm, 680 mm×880 mm, 1000 mm×1200 mm, 1100 mm×1250 mm, or 1150 mm×1300 mm. The present invention further provides a method for manufacturing a liquid crystal display device suitable for mass production using a large-area substrate having a size of 1500 mm×1800 mm, 1800 mm×2000 mm, 2000 mm×2100 mm, 2200 mm×2600 mm, 2600 mm×3100 mm, or the like.

In a liquid crystal dripping method, the sealant is cured at different timing from that in a liquid crystal injection method; thus, a different material from that used in a liquid crystal injection method is used as the sealant. In a liquid crystal injection method, a sealant which is cured by heat press, and an ultraviolet curing resin as a sealing material with which the inlet is sealed after liquid crystal injection are used. Meanwhile, in a liquid crystal dripping method, a sealant which is cured by performing heat treatment after irradiation with ultraviolet light is used.

In a liquid crystal injection method, the sealant which is cured by heat press and the liquid crystal are in contact with each other, while in a liquid crystal dripping method, the sealant which is not cured and the liquid crystal are in contact with each other. Therefore, in the case of using a liquid crystal dripping method, it is preferable to select a sealant which does not adversely affect the liquid crystal even if the sealant which is not cured and the liquid crystal are in contact with each other. Thus, it is another object of the present invention to provide a method for manufacturing a liquid crystal display device which does not adversely affect the liquid crystal even if the sealant which is not cured and the liquid crystal are in contact with each other.

The present inventors consider that the orientation of the liquid crystal molecules is disordered by division of the substrates in the case of using a liquid crystal dripping method because shearing force is high in a dividing step after heat treatment for aligning the liquid crystal molecules. In a conventional dividing step, scribing is performed using a scribing apparatus, and then, the substrates are divided by applying impact using a breaking apparatus.

Thus, in a method for manufacturing a liquid crystal display device using a liquid crystal dripping method, before attachment of a pair of substrates under reduced pressure, a scribe groove is provided for at least one of the pair of substrates with a diamond cutter or the like. This scribe groove is provided so as to have a cutting depth such that the substrate is not divided by being transferred or due to its weight. After the scribing, the pair of substrates are attached to each other under reduced pressure, heat treatment for curing a sealant and aligning the liquid crystal molecules is performed, and then, the substrates are divided by applying impact using a breaking apparatus. Since the scribing is performed in advance, the substrates can be divided with low pressing force. Therefore, by performing the scribing before attachment of the substrates, the orientation of the liquid crystal molecules can be prevented from being disordered when the substrates are divided.

According to one aspect of the present invention disclosed in this specification, a method for manufacturing a liquid crystal display device includes the steps of: forming a sealant over one of a pair of substrates; dripping liquid crystal to a region surrounded by the sealant; providing a cutting depth for at least one of the pair of substrates before attaching the pair of substrates to each other; attaching the pair of substrates to each other under reduced pressure; and dividing the pair of substrates along a band-like region provided with the cutting depth after attaching the pair of substrates to each other.

The present invention solves at least one of the above problems.

When a liquid crystal dripping method is used, since a sealant which is not cured and liquid crystal are in contact with each other, it is preferable to remove a gas component contained in the sealant by disposing the substrate in an atmosphere under reduced pressure immediately after drawing of the sealant. Note that the gas component contained in the sealant includes at least a gas generated from a solvent of the sealant and moisture contained in the sealant.

According to another aspect of the present invention disclosed in this specification, a method for manufacturing a liquid crystal display device includes the steps of: forming a sealant over one of a pair of substrates; removing a gas component from the sealant by providing the substrate provided with the sealant under first reduced pressure; providing a cutting depth for at least one of the pair of substrates before attaching the pair of substrates to each other; attaching the pair of substrates to each other under second reduced pressure which is different from the first reduced pressure; and dividing the pair of substrates along a band-like region provided with the cutting depth after attaching the pair of substrates to each other.

Further, in order to prevent a gas component from generating by the degree of vacuum when the substrates are later attached to each other, it is preferable to set the degree of vacuum in degassing after the sealant is drawn to be higher than that when the substrates are attached to each other.

In a liquid crystal injection method, heat press is performed. Therefore, when scribing is performed before attaching a pair of substrates to each other, there is a concern that the substrate is divided by pressure in attachment, and it is difficult to apply even pressure to the substrate, which results in uneven gaps between the substrates.

In the case of using a liquid crystal dripping method, even if scribing is performed before attaching a pair of substrates to each other, a step of applying pressure to the substrate is not performed before a step of division of the substrates. Although pressure is applied to part of the substrate when the atmosphere is changed from reduced pressure to atmospheric pressure after attachment, this part is included in a region surrounded by the sealant having a closed pattern of the substrate, which does not lead to division of the substrate. Needless to say, when the pair of substrates are attached to each other under reduced pressure after the scribing, the sealant can be cured without any problems, so that a sufficient adhering property of the sealant, e.g., a seal strength of 200 N/cm$^2$ or more can be obtained.

When the substrate is moved, for example, the substrate is transferred or alignment of the substrate is performed, some power is applied from the outside, and the substrate can be divided. In order to prevent this, before or after the scribing, an adhesive sheet, tape, or the like may be attached to the band-like region to which the scribing is performed, so that broken pieces of the substrate are not scattered. The tape may be attached to the band-like region on the surface to which the scribing is performed or the surface to which the scribing is not performed. Note that the tape is attached temporarily in this case and can be peeled off after dividing the substrate. By use of the tape, broken pieces of the substrate can be prevented from being scattered in a transfer chamber or attachment equipment.

The scribing is performed so as to provide a cutting depth such that the substrate is not divided by being transferred or its weight. The cutting depth d depends on a material, a thickness, or the like of the substrate. For example, when a glass substrate with a thickness of 0.7 mm is used, the cutting depth is preferably 0.2 mm or more and less than 0.5 mm. With a cutting depth of less than 0.2 mm, power applied in dividing the substrate by a breaking apparatus is increased; thus, there is a concern that the orientation of the liquid crystal molecules is disordered. With a cutting depth of 0.5 mm or more, since the scribing is performed by fixing the substrate with a vacuum chuck, the substrate is broken when the vacuum chuck is turned off after the scribing even if the substrate is not divided immediately after the scribing. Therefore, when the thickness of the substrate is set to be X, the cutting depth d is set to be two-sevenths or more and less than five-sevenths of the thickness X of the substrate. The cutting depth also depends on the type of the blade of a cutter, or pressure of a cutter; therefore, the cutting depth is preferably adjusted by a scribing apparatus as appropriate to have the most suitable value. The thickness X of a glass substrate that is used can be thinned in advance by grinding-polishing equipment. For example, a glass substrate with a thickness of 0.5 mm can be thinned to 0.25 mm. Therefore, the thickness X of the substrate before the scribing is in the range of 0.25 to 2.5 mm, inclusive.

As long as a groove which does not divide the substrate can be formed in cutting, a scribing apparatus using laser light may also be used, not limited to the scribing apparatus using a diamond cutter.

There is no particular limitation on the foregoing liquid crystal display device, and a liquid crystal display device using TN liquid crystal, IPS liquid crystal, OCB liquid crystal, STN liquid crystal, VA liquid crystal, ECB liquid crystal, GH liquid crystal, polymer dispersed liquid crystal, discotic liquid crystal, or the like can be used. Among them, a normally black liquid crystal panel, such as a transmissive liquid crystal display device utilizing a vertical alignment (VA) mode is preferable. Some examples are given as a vertical alignment mode. For example, an MVA (multi-domain vertical alignment) mode, a PVA (patterned vertical alignment) mode, or an ASV mode can be employed. Specifically, one pixel is divided into a plurality of sub-pixels and a projecting portion is provided in a position of a counter substrate corresponding to the center of each sub-pixel, so that a multi-domain pixel is formed. Note that the projecting portion may be provided on either the counter substrate or the element substrate, or both of them. The projecting portion makes liquid crystal molecules align radially and improves controllability of the alignment.

Further, an electrode for driving liquid crystal, that is, a pixel electrode may have a top view shape like a comb-shape or a zigzagged shape so that a direction in which voltage is applied may be varied. Alternatively, a multi-domain pixel may be formed utilizing photo-alignment.

As an active element connected to the pixel electrode, a two-terminal active element such as a diode, an MIM, or a ZnO varistor, or a three-terminal active element such as an amorphous TFT or a polysilicon TFT can be used.

The method as described above is about not only a matter of design. The present inventors invented the method as a result of careful examination, by forming a liquid crystal panel using substrate attachment equipment which performs attachment of substrates under reduced pressure, manufacturing a display device using the liquid crystal panel, and displaying images with the display device.

It is possible to prevent orientation of liquid crystal molecules from being disordered due to division of substrates even when a liquid crystal dripping method is used.

DETAILED DESCRIPTION OF THE INVENTION

Hereinafter, embodiment modes of the present invention will be described with reference to the accompanying drawings. Note that the present invention is not limited to the following description, and modes and details thereof can be modified in various ways without departing from the spirit and the scope of the invention. Therefore, the present invention should not be interpreted as being limited to the following description of the embodiment modes.

Embodiment Mode 1

Figure 1A:
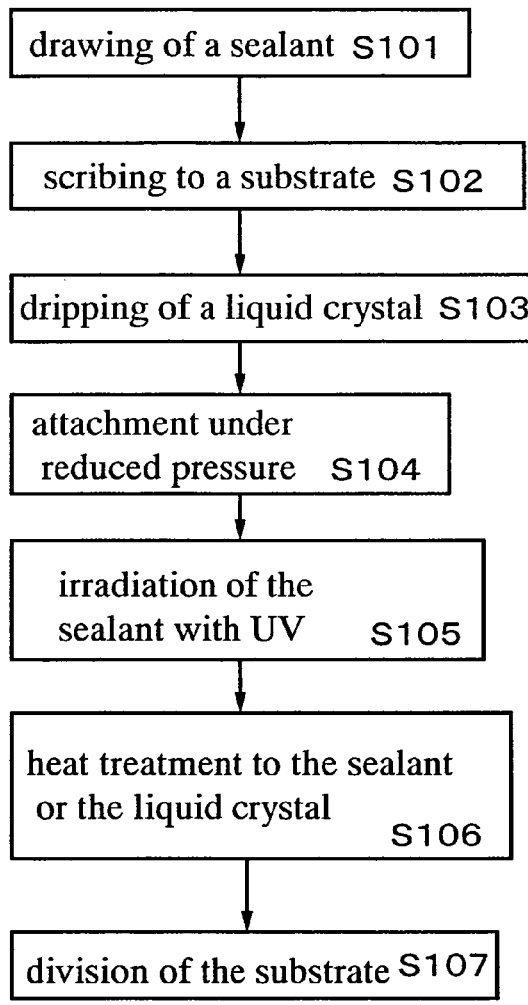
FIGS. 1A and 1B show examples of a manufacturing flow.
Figure 1B:
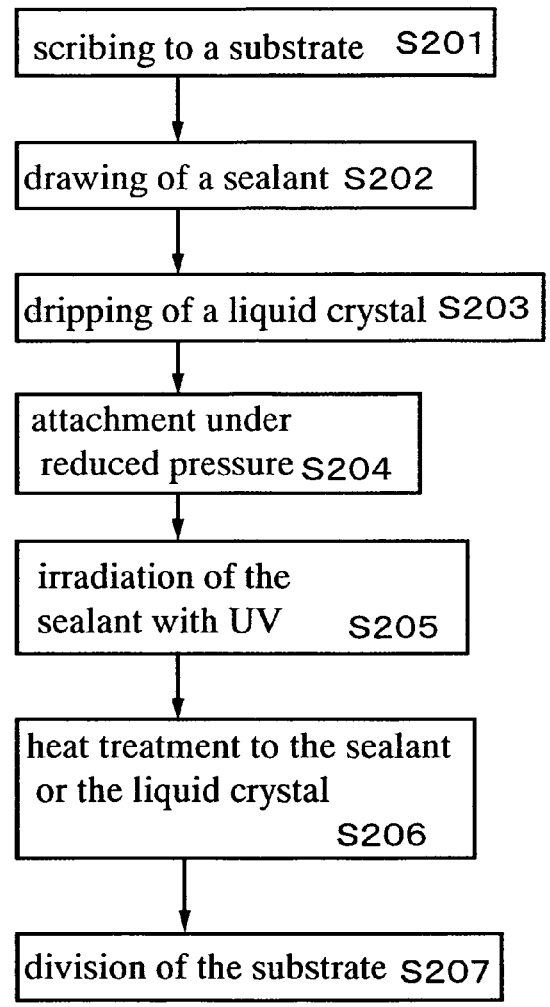

This embodiment mode will describe an example of drawing of a sealant and dripping of liquid crystal on a counter substrate. The flow of panel-manufacturing will be described hereinafter. FIGS. 1A and 1B are flow charts of main manufacturing steps. In addition, FIGS. 2A to 2G are cross-sectional views illustrating the manufacturing steps.

First, a second substrate 120 used as a counter substrate and a first substrate 110 provided with a TFT (not shown in the drawings) in advance are prepared. The first substrate 110 and the second substrate 120 are not limited to particular substrates as long as they are substrates having a light-transmitting property, but a glass substrate is typically used. In this embodiment mode, a glass substrate with a thickness of 0.7 mm is used. Note that the TFT may be any of a TFT using polysilicon as an active layer (also referred to as a polysilicon TFT), a TFT using amorphous silicon as an active layer (also referred to as an amorphous silicon TFT), and a TFT using an organic semiconductor material as an active layer (also referred to as an organic TFT).

Figure 2A:
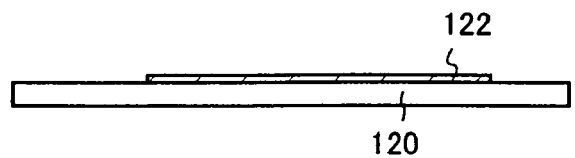
FIGS. 2A to 2G are cross-sectional views illustrating manufacturing steps of an LCD.

Next, a counter electrode 122 formed of a transparent conductive film is formed over the second substrate 120 (FIG. 2A). In addition, alignment films (not shown in the drawings) are formed for both the substrates and rubbing treatment is performed thereto, if necessary.

Figure 2B:

Next, a sealant 112 is drawn on the second substrate 120. The sealant 112 is drawn by a screen printing method or by using an ink-jet apparatus or a dispenser apparatus. This drawing of the sealant corresponds to a first step S101 in the flow chart of FIG. 1A. The sealant may be formed for either the first substrate 110 or the second substrate 120, or both of them. The sealant 112 may be an acrylic photo-curing resin or the like. As the sealant 112, a sealant containing filler (with a diameter of 6 to 24 μm) and having a viscosity of 40 to 400 Pa·s is used. Note that a seal material which does not dissolve in liquid crystal which is in contact therewith later is preferably selected. This sealant 112 is formed into a closed loop shape and surrounds the counter electrode 122 (FIG. 2B).

Figure 2C:
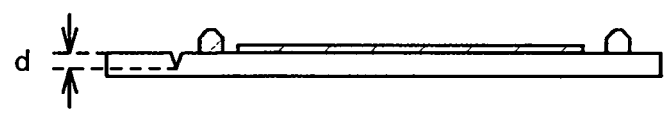

Then, scribing is performed to the second substrate 120. This scribing to the substrate corresponds to a second step S102 in the flow chart of FIG. 1A. Scribing may be performed to either the first substrate 110 or the second substrate 120, or a scribe groove may be formed for both the substrates. Further, scribing may be performed to either the top surface or the bottom surface, or both the top and bottom surfaces of one substrate. Scribing is performed by using a scribing apparatus having a diamond cutter or the like. As illustrated in FIG. 2C, a scribe groove with a cutting depth d is formed on one surface of the substrate.

Table 1 shows a relation between a cutting depth d that is obtained and pressure of a cutter (kgf/cm$^2$), when scribing is performed to a glass substrate with a thickness of 0.7 mm and conditions of pressure of a cutter and the like are made varied so that cutting depths D of the scribing apparatus are set to be 0.1, 0.2, 0.3, 0.4, and 0.5 mm. Further, it is evaluated whether the value of the cutting depth d is suitable for a manufacturing method in this embodiment mode.

TABLE 1

| pressure of a cutter (kgf/cm2) | cutting depth:d (mm) | evaluation |
|---|---|---|
| 0 | 0.13 | x |
| 0.1 | 0.27 | Δ |
| 0.1 | 0.35 | ○ |
| 0.2 | 0.46 | ○ |
| 0.2 | 0.52 | x |

As shown in Table 1, the cutting depth d of 0.13 mm is unsuitable (X) for the present invention because a value of pressure in dividing the substrate by pressure application is relatively high. The cutting depth d of 0.27 mm can reduce the value of pressure in dividing the substrate by pressure application, but there is a concern that orientation of liquid crystal molecules is disordered depending on the gap between the substrates or an orientation condition of the liquid crystal molecules. The cutting depth d of 0.52 mm divides the substrate easily even when only a small amount of power is applied, for example, when the substrate is transferred. Thus, the cutting depth d of 0.52 mm is unsuitable (X) for the present invention. According to Table 1, it is preferable to set the cutting depth D of the scribing apparatus to be 0.2 mm or more and less than 0.5 mm, more preferably, 0.3 mm or more and less than 0.5 mm.

Figure 2D:
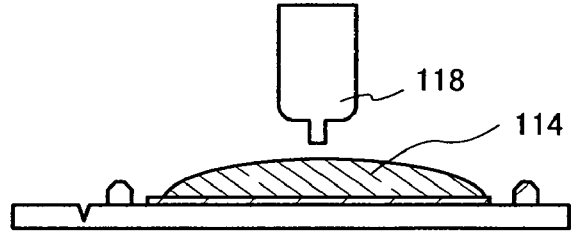

Next, liquid crystal is dripped to the second substrate 120. An ink-jet apparatus or a dispenser apparatus is used for dripping of the liquid crystal. This dripping of the liquid crystal to the substrate corresponds to a third step S103 in the flow chart of FIG. 1A. The liquid crystal may be dripped to either the first substrate 110 or the second substrate 120, or both of them. As illustrated in FIG. 2D, liquid crystal 114 is dripped to a region surrounded by the sealant 112 by use of a liquid crystal dispenser 118 under atmospheric pressure. As the liquid crystal 114, a known liquid crystal material having viscosity which enables the liquid crystal to be dripped may be used. By use of the liquid crystal dispenser, only the necessary amount of the liquid crystal 114 can be held in the region surrounded by the sealant 112 without the loss of the liquid crystal. Alternatively, the liquid crystal may be dripped by an ink-jet method.

Figure 2E:
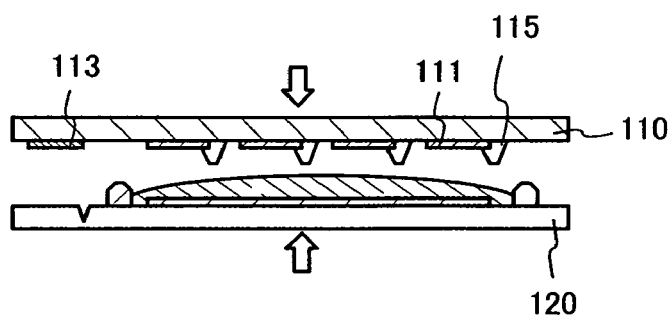

Then, the pair of substrates are attached to each other under reduced pressure. This attachment under reduced pressure corresponds to a fourth step S104 in the flow chart of FIG. 1A. The first substrate 110 is provided with a pixel electrode 111, a terminal electrode 113, and a columnar spacer 115 in advance. The first substrate 110 which is provided with a pixel portion having the pixel electrode 111 and the second substrate 120 which is provided with the counter electrode 122, the alignment film, and/or the like are attached to each other under reduced pressure so that bubbles do not enter a gap between them (FIG. 2E).

Then, the sealant is irradiated with ultraviolet light. This irradiation of the sealant with ultraviolet light corresponds to a fifth step S105 in the flow chart of FIG. 1A.

Figure 2F:
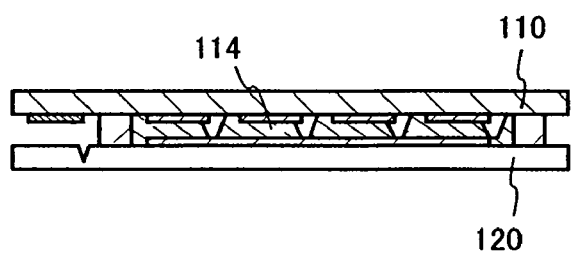

After that, heat treatment is performed to further cure the sealant 112. At the same time, the liquid crystal is also heated, so that the liquid crystal molecules are aligned. This heat treatment to the sealant or the liquid crystal corresponds to a sixth step S106 in the flow chart of FIG. 1A. By this heat treatment, the gap between the substrates is fixed. As illustrated in FIG. 2F, the gap between the substrates is held by the columnar spacer 115.

Although the sealant is cured by the heat treatment after the irradiation with ultraviolet light, the present invention is not limited thereto, and an acrylic thermosetting resin may used as the sealant as long as a sufficient adhering property of the sealant, e.g., a seal strength of 200 N/cm$^2$ or more, can be obtained.

Figure 2G:

Next, the substrate is divided as illustrated in FIG. 2G. This division of the substrate corresponds to a seventh step S107 in the flow chart of FIG. 1A. Pressure is applied along a scribe line which is a continuous scribe groove, and the substrate is divided, whereby the terminal electrode 113 is exposed. Since the scribe line is formed in advance, part of the second substrate can be divided with low power. Therefore, even if the substrate is divided after the heat treatment for aligning the liquid crystal molecules, the orientation of the liquid crystal molecules can be prevented from being disordered.

The TN liquid crystal display device is described as an example in this embodiment mode. In the case of the IPS liquid crystal display device, the counter electrode is not provided for the counter substrate.

FIG. 1A shows the flow of manufacturing in which scribing is performed to the substrate after the sealant is drawn. However, the present invention is not limited thereto as long as scribing is performed before attachment of the substrates under reduced pressure. As shown in FIG. 1B, the sealant may be drawn after scribing is performed to the substrate. In that case, a first step S201 corresponds to the scribing to the substrate, a second step S202 corresponds to the drawing of the sealant, a third step S203 corresponds to the dripping of the liquid crystal, a fourth step S204 corresponds to the attachment of the substrates under reduced pressure, a fifth step S205 corresponds to the irradiation of the sealant with ultraviolet light, a sixth step S206 corresponds to the heat treatment to the sealant or the liquid crystal, and a seventh step 207 corresponds to the division of the substrate.

Embodiment Mode 2

This embodiment mode will describe an example of a method in which a plurality of panels are manufactured from one substrate.

Figure 3A:
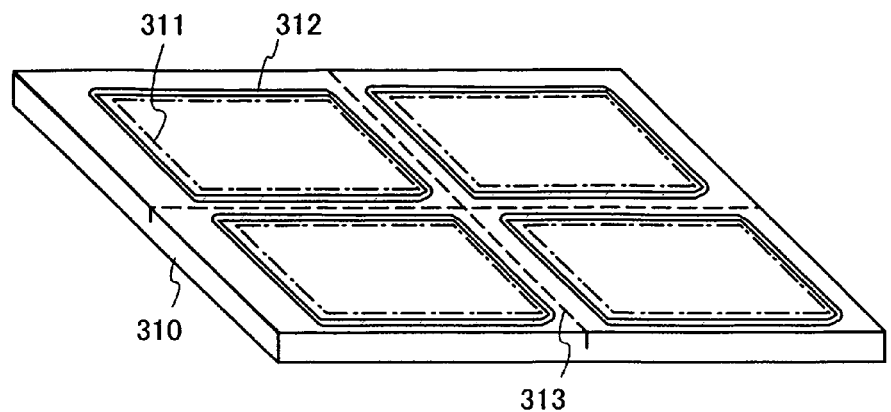
FIGS. 3A and 3C are perspective views and FIG. 3B is a cross-sectional view each illustrating part of manufacturing steps.

As a substrate 310 illustrated in FIG. 3A, a quartz substrate with a thickness of 1.1 mm is used. A pixel portion 311 having a pixel electrode is formed over the substrate 310. This embodiment mode shows an example in which four pixel portions 311 are formed.

A scribe groove 313 is formed using a diamond cutter or laser light. The scribe groove is formed so as to separate the pixel portions 311. In the case of using the quartz substrate, the cutting depth d is more than 0.3 mm and 0.7 mm or less, and preferably about 0.6 mm here. Since the quartz substrate is harder than a glass substrate, the quartz substrate is broken only by scribing, when pressure of a cutter is increased to form a scribe groove with a cutting depth of over 0.7 mm. In addition, when the cutting depth d is 0.3 mm or less, it is difficult to divide the substrate unless power for division is increased.

Next, a sealant 312 is formed to surround the pixel portion 311. The sealant 312 has a closed pattern and is formed between the peripheral edge of the pixel portion 311 and the edge of the substrate 310, or between the scribe groove 313 and the peripheral edge of the pixel portion 311.

Figure 3B:
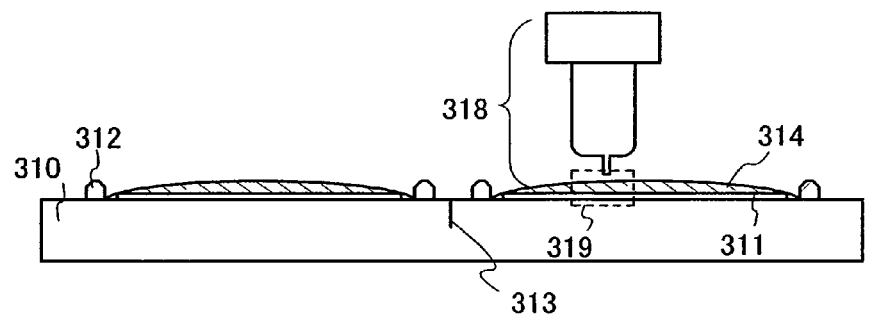

FIG. 3B is a cross-sectional view during formation of a liquid crystal layer using a liquid crystal dispenser 318. A liquid crystal material 314 is dripped or discharged from the liquid crystal dispenser 318 so that the pixel portion 311 surrounded by the sealant 312 is covered. The liquid crystal dispenser 318 may be moved, or the liquid crystal dispenser 318 may be fixed and the substrate may be moved to form the liquid crystal layer. Further, a plurality of the liquid crystal dispensers 318 may be provided in one treatment chamber, so that the liquid crystal may be dripped to plural parts of one substrate at one time.

Figure 3C:
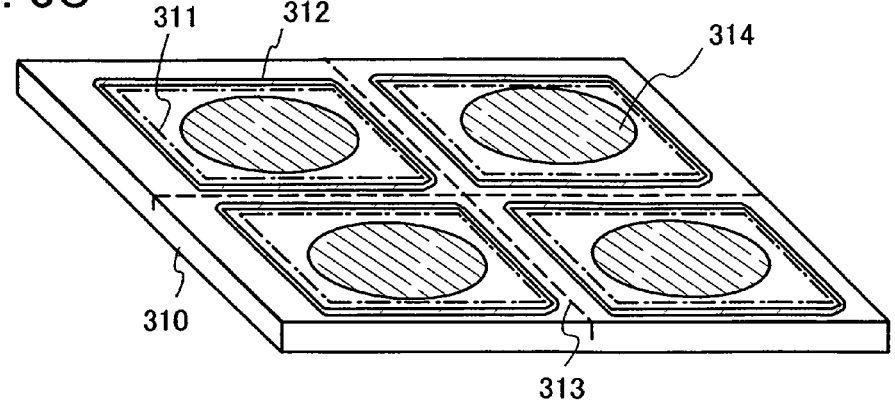

In addition, FIG. 3C is a perspective view after formation of the liquid crystal layer. The liquid crystal material 314 is dripped or discharged to the regions surrounded by the sealants 312 as selected.

Then, another substrate is attached to the substrate 310 under reduced pressure. Finally, the substrates are divided and four panels are manufactured. Since the scribe groove is provided in advance before the substrates are attached to each other, the substrates after being attached to each other can be divided with relatively low power. Therefore, disorder of the orientation of the liquid crystal molecules which is due to pressure applied in dividing the attached substrates can be suppressed.

In particular, when a plurality of panels are manufactured from one substrate, the distance between the adjacent pixel portions is preferably shortened in order to manufacture a plurality of panels from one substrate efficiently. In addition, when the distance between the adjacent sealants is short, it is difficult to divide the substrates; therefore, high pressure is applied to divide the substrates. Accordingly, since the distance between the scribe groove and the sealant and the distance between the scribe groove and the liquid crystal layer are shortened, the present invention is very effective, which reduces the pressure applied in dividing the substrates by providing the scribe groove in advance before the substrates are attached to each other.

Although this embodiment mode shows an example in which, after the sealant and the liquid crystal layer are formed over the substrate having the pixel portion, the substrate having the pixel portion is attached to another substrate, that is, the counter substrate, the present invention is not limited thereto; the sealant and the liquid crystal layer may be provided for the counter substrate as in Embodiment Mode 1.

This embodiment mode can be freely combined with Embodiment Mode 1. For example, the sealant and the scribe groove may be formed for the substrate having the pixel portion, the sealant and the scribe groove may also be formed for the counter substrate, the pair of substrates may be attached to each other under reduced pressure, and then, the substrates may be divided. In this case, since the scribe grooves are formed for the both substrates in advance, the both substrates can be divided by one dividing treatment.

Embodiment Mode 3

This embodiment mode will describe an example in which degassing treatment of a sealant is performed under reduced pressure with a higher degree of vacuum than in the case of attaching substrates to each other.

Figure 4:
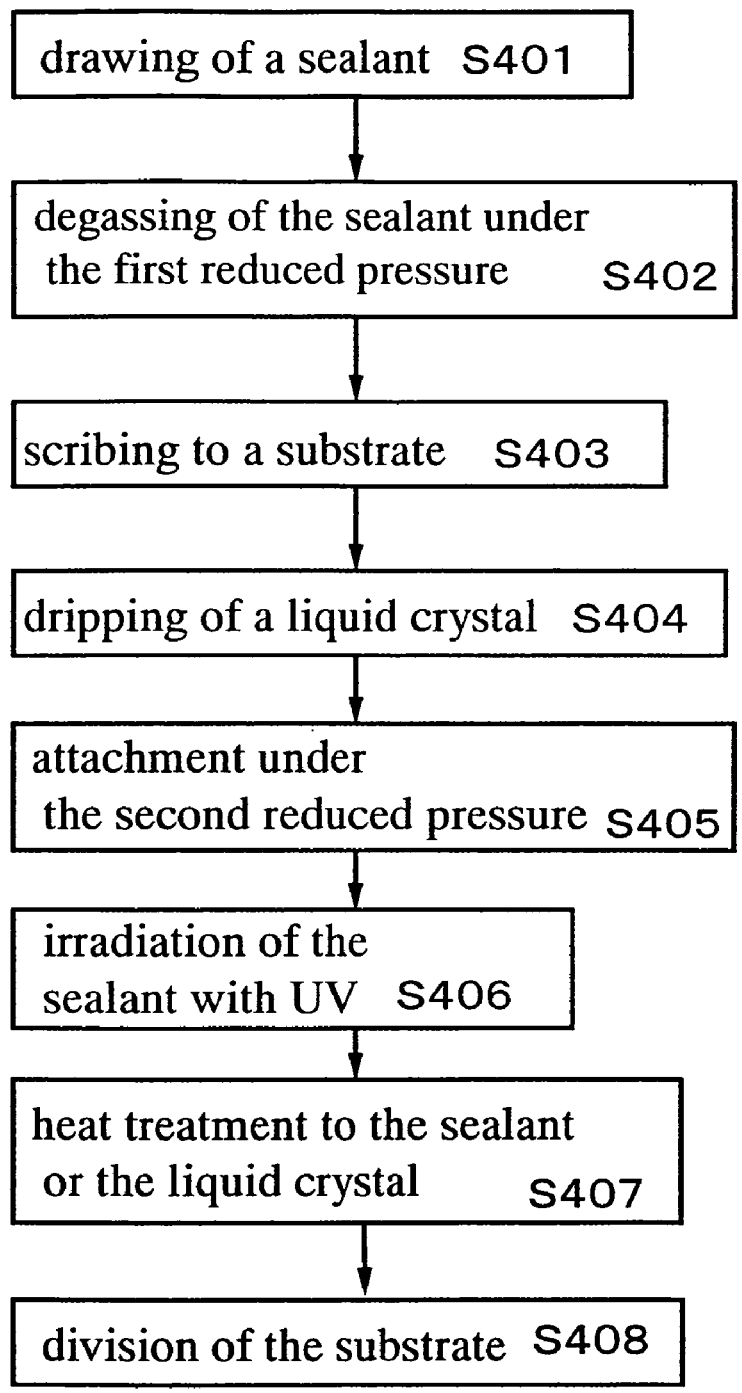
FIG. 4 shows an example of a manufacturing flow.

First, a sealant is drawn on a substrate. This drawing of the sealant corresponds to a first step S401 in the flow chart of FIG. 4. A photo-curing resin is used as the sealant. As the sealant, a material which is cured efficiently by performing heat treatment after irradiation with ultraviolet light is used. When a liquid crystal dripping method is used, the sealant is cured and the liquid crystal molecules are aligned by performing irradiation with ultraviolet light and heat treatment in this order after the substrates are attached to each other; therefore, the order of the irradiation with ultraviolet light and the heat treatment is important. Such a sealant is not easily polymerized when being subjected to the heat treatment and then irradiated with ultraviolet light, and there is a concern that it becomes difficult to obtain a desired seal strength.

Next, degassing of the sealant is performed under first reduced pressure (e.g., a degree of vacuum is $10^{-5}$ to $10^{-6}$ Pa) and the surface of the sealant to be in contact with liquid crystal which is dripped later is dried. Accordingly, adverse effect due to contact of the sealant and the liquid crystal can be reduced. The degassing of the sealant under the first reduced pressure corresponds to a second step S402 in the flow chart of FIG. 4. In the case of using a liquid crystal dripping method, since the sealant which is not cured and the liquid crystal are in contact with each other, it is preferable to remove a gas component contained in the sealant by disposing the substrate in an atmosphere under reduced pressure immediately after the drawing of the sealant. Note that it is preferable to dispose the substrate in an atmosphere under reduced pressure without performing heating which cures the sealant.

Further, in order to prevent a gas component from generating by the degree of vacuum when the substrates are later attached to each other, it is preferable to set the degree of vacuum in degassing after the sealant is drawn to be higher than that when the substrates are attached to each other.

Next, scribing is performed to at least one of the pair of substrates. This scribing to the substrate corresponds to a third step S403 in the flow chart of FIG. 4.

Next, liquid crystal is dripped to the substrate. This dripping of the liquid crystal to the substrate corresponds to a fourth step S404 in the flow chart of FIG. 4. The liquid crystal may be dripped to at least one of the pair of substrates. The liquid crystal is dripped to a region surrounded by the sealant by a liquid crystal dispenser under atmospheric pressure. As the liquid crystal, a known liquid crystal material having viscosity which enables the liquid crystal to be dripped may be used. By the liquid crystal dispenser, only the necessary amount of the liquid crystal can be held in the region surrounded by the sealant without the loss of the liquid crystal.

Then, the pair of substrates are attached to each other under second reduced pressure. This attachment of the substrates under the second reduced pressure corresponds to a fifth step S405 in the flow chart of FIG. 4. Since degassing of the sealant is performed under the first reduced pressure in advance, a gas can be prevented from being released from the sealant during the attachment of the substrates.

Then, the sealant is irradiated with ultraviolet light. This irradiation of the sealant with ultraviolet light corresponds to a sixth step S406 in the flow chart of FIG. 4.

After that, heat treatment is performed to further cure the sealant. At the same time, the liquid crystal is also heated, so that the liquid crystal molecules are aligned. This heat treatment to the sealant or the liquid crystal corresponds to a seventh step S407 in the flow chart of FIG. 4. By this heat treatment, the gap between the substrates is fixed.

Next, the substrate is divided. This division of the substrate corresponds to an eighth step S408 in the flow chart of FIG. 4. Pressure is applied along a scribe line which is a continuous scribe groove, and the substrate is divided. Since the scribe line is formed in advance, the substrate can be divided with low power. Therefore, even if the substrate is divided after the heat treatment for aligning the liquid crystal molecules, the orientation of the liquid crystal molecules can be prevented from being disordered.

In the case of using a liquid crystal dripping method, since the sealant which is not cured and the liquid crystal are in contact with each other, it is preferable to remove a gas component contained in the sealant by disposing the substrate in an atmosphere under reduced pressure immediately after the drawing of the sealant. The gas component contained in the sealant includes at least a gas generated from a solvent of the sealant and moisture contained in the sealant.

Another structure of the present invention disclosed in this specification is a method for manufacturing a liquid crystal display device including: forming a sealant for one of a pair of substrates, removing a gas component from the sealant by disposing the substrate provided with the sealant under first reduced pressure, providing a cutting depth for at least one of the substrates before the pair of substrates are attached to each other, attaching the pair of substrates to each other under second reduced pressure which is different from the first reduced pressure, and dividing the pair of substrates along a band-like region provided with the cutting depth after attaching the substrates to each other.

Further, in order to prevent a gas component from generating by the degree of vacuum when the substrates are later attached to each other, it is preferable to set the degree of vacuum in degassing after the sealant is drawn to be higher than that when the substrates are attached to each other.

Through the above process, a method for manufacturing a liquid crystal display device can be provided, in which liquid crystal is not adversely affected even when a sealant which is not cured and liquid crystal are in contact with each other. Further, the orientation of the liquid crystal molecules can be prevented from being disordered by pressure which is applied in dividing the attached substrates.

This embodiment mode can be freely combined with Embodiment Mode 1 or 2. For example, as shown in the flow chart of FIG. 1B, the sealant may be drawn after scribing is performed to the substrate.

The present invention having the above structure will be more specifically explained with embodiments described hereinafter.

Embodiment 1

Figure 5:
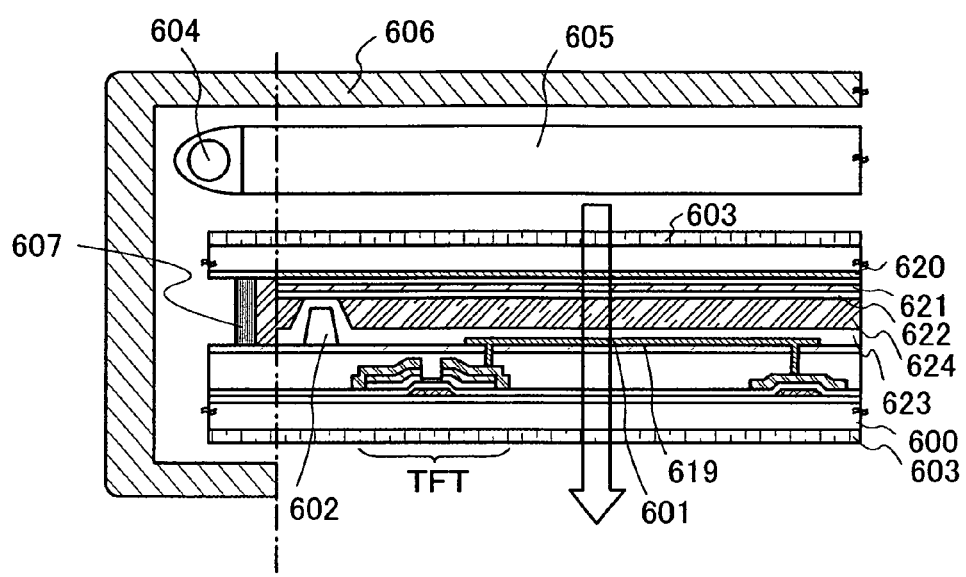
FIG. 5 is a cross-sectional structural view illustrating an active matrix liquid crystal display device.

This embodiment will describe a manufacturing process of an active matrix liquid crystal display device with reference to FIG. 5.

First, an active matrix substrate is manufactured using a substrate 600 having a light-transmitting property. The manufacturing cost is preferably reduced by using a large-area substrate having a size of, for example, 600 mm×720 mm, 680 mm×880 mm, 1000 mm×1200 mm, 1100 mm×1250 mm, 1150 mm×1300 mm, 1500 mm×1800 mm, 1800 mm×2000 mm, 2000 mm×2100 mm, 2200 mm×2600 mm, or 2600 mm×3100 mm. As for the substrate, a glass substrate made of barium borosilicate glass, aluminoborosilicate glass, or the like typified by Corning 7059 glass, 1737 glass, or the like manufactured by Corning Incorporated can be used. As another example of the substrate, a light-transmitting substrate such as a quartz substrate can be used. First, a conductive layer is formed over the entire surface of the substrate 600 having an insulating surface by a sputtering method. After that, a resist mask is formed by a first photolithography step, and an unnecessary portion is removed by etching to form a wire and an electrode (such as a gate electrode, a storage capacitor wire, and a terminal). Note that a base insulating film is formed over the substrate 600 if necessary.

The wire and the electrode are formed using an element selected from titanium, tantalum, tungsten, molybdenum, chromium, and neodymium, an alloy containing the element as a component, or nitride containing the element as a component. Further, two or more of elements selected from titanium, tantalum, tungsten, molybdenum, chromium, and neodymium, an alloy containing the element as a component, and nitride containing the element as a component may be selected and stacked.

As a screen size gets larger, the length of each wire is increased, and the problem of an increase in wire resistance is caused, which causes an increase in power consumption. Therefore, in order to decrease wire resistance and reduce power consumption, copper, aluminum, silver, gold, chromium, iron, nickel, platinum, or an alloy thereof can be used as materials of the above wire and electrode. Further, the wire and the electrode may also be formed by an ink-jet method using an independently dispersed ultrafine particle dispersion liquid in which ultrafine particles (each with a grain size of 5 to 10 nm) of metal such as silver, gold, copper, or palladium are dispersed at high concentration without being aggregated.

Next, a gate insulating film is formed over the entire surface by a PCVD method. The gate insulating film is formed using a stacked-layer of a silicon nitride film and a silicon oxide film with a thickness of 50 to 200 nm, preferably 150 nm. Note that the gate insulating film is not limited to a stacked-layer, and an insulating film such as a silicon oxide film, a silicon nitride film, a silicon oxynitride film, or a tantalum oxide film can also be used.

Then, over the entire surface of the gate insulating film, a first amorphous semiconductor film is formed with a thickness of 50 to 200 nm, preferably 100 to 150 nm by a known method such as a plasma CVD method or a sputtering method. Typically, an amorphous silicon (a-Si) film is formed with a thickness of 100 nm. Note that since a chamber size is increased when forming a film over a large-area substrate, it takes long processing time to evacuate the chamber and requires a large amount of a film formation gas. Therefore, further cost reduction may be achieved by forming the amorphous silicon (a-Si) film using a linear plasma CVD apparatus under atmospheric pressure.

After that, a second amorphous semiconductor film containing an impurity element imparting one conductivity type (n-type or p-type) is formed with a thickness of 20 to 80 nm. The second amorphous semiconductor film containing an impurity element imparting one conductivity type (n-type or p-type) is formed over the entire surface by a known method such as a plasma CVD method or a sputtering method. In this embodiment, the second amorphous semiconductor film containing an impurity element imparting n-type conductivity is formed using a silicon target to which phosphorus is added.

Next, a resist mask is formed by a second photolithography step, and an unnecessary portion is removed by etching to form a first island-shaped amorphous semiconductor film and a second island-shaped amorphous semiconductor film. Wet etching or dry etching is used as an etching method at this time.

Then, a conductive layer covering the second island-shaped amorphous semiconductor film is formed by a sputtering method. After that, a resist mask is formed by a third photolithography step, and an unnecessary portion is removed by etching to form a wire and an electrode (such as a source wire, a drain electrode, and a storage capacitor electrode). The above wire and electrode are formed using an element selected from aluminum, titanium, tantalum, tungsten, molybdenum, chromium, neodymium, copper, silver, gold, chromium, iron, nickel, and platinum, or an alloy containing the element as a component. Alternatively, the wire and the electrode may be formed by an ink-jet method using an independently dispersed ultrafine particle dispersion liquid in which ultrafine particles (each with a grain size of 5 to 10 nm) of metal such as silver, gold, copper, or palladium are dispersed at high concentration without being aggregated. By forming the wire and the electrode by an ink-jet method, the photolithography step becomes unnecessary and a further cost reduction can be achieved.

Next, a resist mask is formed by a fourth photolithography step, and an unnecessary portion is removed by etching to form a source wire, a drain electrode, and a capacitor electrode. Wet etching or dry etching is used as an etching method at this time. At this time, a storage capacitor is formed which uses, as a dielectric, an insulating film made of the same material as the gate insulating film. Then, using the source wire and the drain electrode as masks, part of the second amorphous semiconductor film is removed in a self-aligned manner and part of the first amorphous semiconductor film is thinned. The thinned region serves as a channel formation region of a TFT.

Then, a first protective film made of a silicon nitride film with a thickness of 150 nm and a first interlayer insulating film formed using a silicon oxynitride film with a thickness of 150 nm are formed over the entire surface by a plasma CVD method. Note that since a chamber size is increased when forming a film over a large-area substrate, it takes long processing time to evacuate the chamber and requires a large amount of a film formation gas. Therefore, a further cost reduction may be achieved by forming the protective film made of a silicon nitride film using a linear plasma CVD apparatus under atmospheric pressure. After that, hydrogenation is performed and a channel-etched TFT is manufactured.

Although the channel-etched type is given in this embodiment as an example of the structure of the TFT, the TFT structure is not particularly limited thereto, and a channel stopper TFT, a top gate TFT, or a staggered TFT may be used.

A second protective film 619 is formed by an RF sputtering method. A silicon nitride film is formed as the second protective film 619 by sputtering a single-crystalline silicon target with an $N_2$ gas or a mixed gas of $N_2$ and a rare gas under the condition that a back-pressure is set at $1 \times 10^{-3}$ Pa or less by using a turbomolecular pump or a cryopump. This dense silicon nitride film effectively prevents variations or the like in threshold voltage which is caused by contamination of the TFT due to alkali metal or alkaline earth metal such as sodium, lithium, or magnesium. Further, the silicon nitride film has an excellent blocking property against moisture or oxygen. The oxygen and hydrogen content in the silicon nitride film is preferably set at 10 at. % or less, more preferably 1 at. % or less in order to increase the blocking property.

Next, a resist mask is formed by a fifth photolithography step, and contact holes which reach the drain electrode and the storage capacitor electrode are then formed by a dry etching step. At the same time, a contact hole (not shown in the drawing) for electrically connecting the gate wire and a terminal may be formed in a terminal portion, and a metal wire (not shown in the drawing) for electrically connecting the gate wire and the terminal may be formed. In addition, at the same time, a contact hole (not shown in the drawing) which reaches the source wire may be formed, and a metal wire connected to the source wire may be formed. A pixel electrode of ITO or the like may be formed after forming these metal wires, or these metal wires may be formed after forming the pixel electrode of ITO or the like.

Then, a transparent conductive film is formed of an alloy of indium oxide and tin oxide (ITO), an alloy of indium oxide and zinc oxide ($In_2O_3$—ZnO), zinc oxide, or the like with a thickness of 110 nm. After that, a sixth photolithography step and an etching step are performed, so that a pixel electrode 601 is formed.

As described above, an active matrix substrate including the source wire, the inverted staggered TF of the pixel portion, the storage capacitor, and the terminal can be manufactured by the six photolithography steps.

Then, an alignment film 623 is formed over the active matrix substrate and rubbing treatment is performed thereto. Note that before formation of the alignment film 623, a columnar spacer 602 is formed at the desired position in order to keep a gap between the substrates by patterning an organic resin film such as an acrylic resin film in this embodiment. Alternatively, spherical spacers may be dispersed over the entire surface of the substrate instead of the columnar spacer.

Then, a counter substrate is prepared. This counter substrate is provided with a color filter 620 in which a colored layer and a light-blocking layer are arranged for each pixel. In addition, a planarizing film is provided to cover the color filter and the light-blocking layer. Then, a counter electrode 621 is formed over the planarizing film using a transparent conductive film in a position overlapping with the pixel portion. Then, an alignment film 622 is formed over the entire surface of the counter substrate and rubbing treatment is performed thereto.

Next, a sealant 607 is drawn so as to surround the pixel portion of the active matrix substrate in accordance with Embodiment Mode 1. After that, scribing is performed, so that a scribe groove with a cutting depth d is formed. Liquid crystal is dripped to the region surrounded by the sealant 607 by a liquid crystal dispenser. Then, the active matrix substrate and the counter substrate are attached to each other under reduced pressure with the sealant 607 to seal a liquid crystal layer 624. The sealant 607 is mixed with filler (not illustrated), so that two substrates can be attached to each other with a uniform gap therebetween by the filler and the spacer 602. By using a liquid crystal dripping method, the amount of liquid crystal used in the manufacturing process can be reduced, and particularly when a large-area substrate is used, the manufacturing cost can be drastically reduced.

Then, the active matrix substrate or the counter substrate is divided into a desired shape. Since the scribe groove is formed in advance, the substrate can be divided with pressure in a range such that the orientation of liquid crystal molecules is not disordered. In such a manner, the active matrix liquid crystal display device is completed.

Furthermore, optical films such as a polarizing plate 603 and a color filter are provided as appropriated using a known technique. Then, an FPC is attached using a known technique.

The liquid crystal module obtained through the above steps is provided with a backlight 604 and a light guiding plate 605 and covered with a cover 606, whereby the active matrix liquid crystal display device (transmissive type) is completed, a partial cross-sectional view of which is illustrated in FIG. 5. Note that the cover and the liquid crystal module are fixed to each other using an adhesive or an organic resin. In addition, since the liquid crystal display device is of transmissive type, the polarizing plate 603 is attached to each of the active matrix substrate and the counter substrate.

Further, an example of the transmissive type is described in this embodiment; however, the liquid crystal display device is not limited thereto, and a reflective or semi-transmissive liquid crystal display device can also be manufactured. In the case of obtaining a reflective liquid crystal display device, a metal film with high optical reflectance, typically, a film containing aluminum or silver as its main component, a stacked-layer thereof, or the like may be used for a pixel electrode.

This embodiment can be freely combined with Embodiment Mode 1, 2, or 3.

Embodiment 2

Figure 6A:
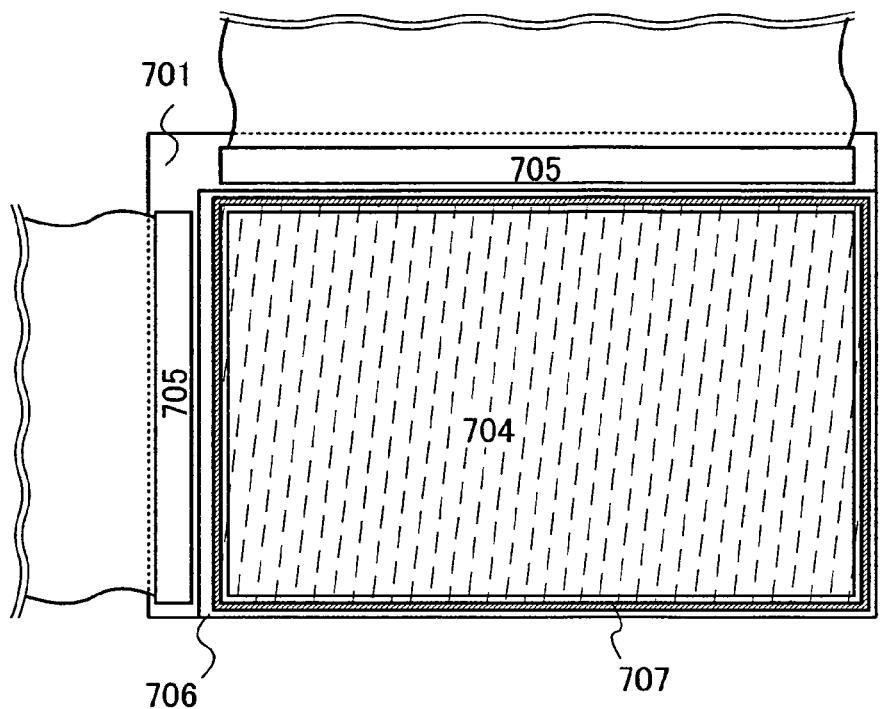
FIGS. 6A and 6B are top views of liquid crystal modules.
Figure 6B:
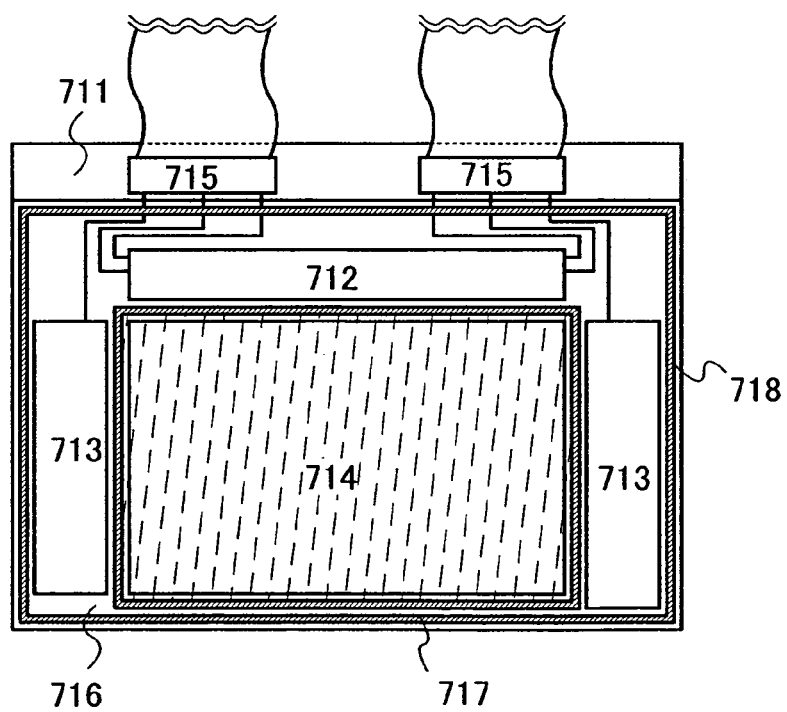

In this embodiment, a top view of the liquid crystal module obtained in Embodiment 1 is illustrated in FIG. 6A, and a top view of a liquid crystal module different from that of Embodiment 1 is illustrated in FIG. 6B.

The TFT whose active layer is formed using an amorphous semiconductor film described in Embodiment 1 has low field-effect mobility, approximately only about 1 cm$^2$/Vsec. Therefore, a driver circuit for performing image display is formed as an IC chip and mounted by a TAB (tape automated bonding) method or a COG (chip on glass) method.

In FIG. 6A, reference numeral 701 denotes an active matrix substrate; 706, a counter substrate; 704, a pixel portion; 707, a sealant; and 705, an FPC. Note that liquid crystal is dripped by a dispenser apparatus or an ink-jet apparatus under reduced pressure, and the pair of substrates 701 and 706 are attached to each other with the sealant 707.

The TFT according to Embodiment 1 has low field-effect mobility, but in the case of mass-production using large-area substrates, the cost for the manufacturing process can be reduced since the manufacturing process is carried out at low temperature. According to the present invention, that is, when the liquid crystal is dripped by a dispenser apparatus or an ink-jet apparatus under reduced pressure and a pair of substrates are attached to each other, the liquid crystal can be held between the pair of substrates regardless of their sizes, so that a display device provided with a liquid crystal panel having a large-sized screen of from 20 to 80 inches can be manufactured.

When an active layer is formed using a semiconductor film which is formed by crystallizing an amorphous semiconductor film to obtain a crystalline structure by a known crystallization treatment, typically, a polysilicon film, a TFT which has high field effect mobility can be obtained, and a driver circuit having a CMOS circuit can also be formed over the same substrate as the pixel portion. Further, in addition to the driver circuit, a CPU and the like can be manufactured over the same substrate as the pixel portion.

When a TFT having an active layer formed using a polysilicon film is used, a liquid crystal module as illustrated in FIG. 6B can be manufactured.

In FIG. 6B, reference numeral 711 denotes an active matrix substrate; 716, a counter substrate; 712, a source signal line driver circuit; 713, a gate signal line driver circuit; 714, a pixel portion; 717, a first sealant; and 715, an FPC. Note that liquid crystal is dripped by a dispenser apparatus or an ink-jet apparatus under reduced pressure, and the pair of substrates 711 and 716 are attached to each other with the first sealant 717 and a second sealant 718. Since the liquid crystal is not necessary for a driver circuit portion including the source signal line driver circuit 712 and the gate signal line driver circuit 713, the liquid crystal is held only in the pixel portion 714, and the second sealant 718 is provided for reinforcement of the whole panel.

This embodiment can be freely combined with Embodiment Mode 1, 2, or 3 or Embodiment 1.

Embodiment 3

Electronic devices can be manufactured by incorporating the liquid crystal display device obtained according to the present invention into a display portion. Examples of the electronic devices are as follows: cameras such as video cameras or digital cameras, goggle type displays (head mounted displays), navigation systems, sound reproduction devices (car audios, audio components, or the like), laptop computers, game machines, mobile information terminals (mobile computers, mobile telephones, mobile game machines, electronic books, or the like), image reproduction devices equipped with recording media (specifically, a device which reproduces the recording medium such as a digital versatile disc (DVD) and which is equipped with a display for displaying the image), and the like. Specific examples of those electronic devices are illustrated in FIGS. 7A to 7H.

Figure 7A:
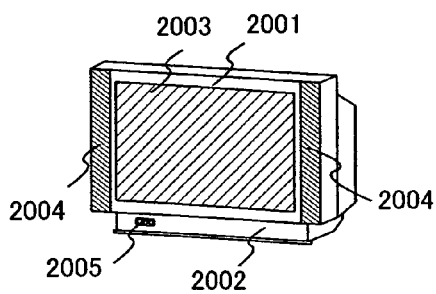
FIGS. 7A to 7H illustrate examples of electronic devices.

FIG. 7A illustrates a television which includes a casing 2001, a supporting base 2002, a display portion 2003, speaker units 2004, a video input terminal 2005, and the like. The present invention can be applied to the display portion 2003. Note that the term "television" includes every television for displaying information such as one for a personal computer, one for receiving TV broadcasting, and one for advertising.

Figure 7B:
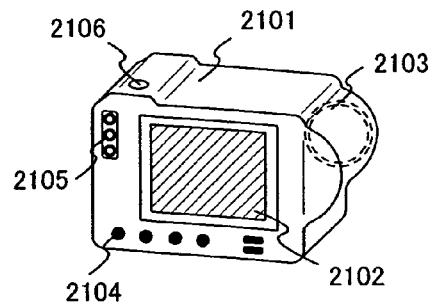

FIG. 7B illustrates a digital camera which includes a main body 2101, a display portion 2102, an image receiving unit 2103, operation keys 2104, an external connection port 2105, a shutter button 2106, and the like. The present invention can be applied to the display portion 2102.

Figure 7C:
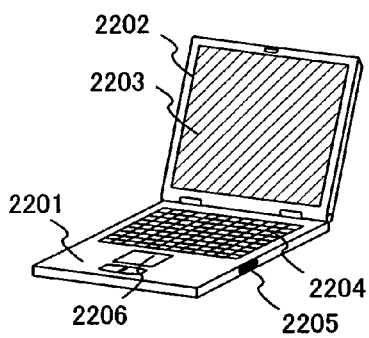

FIG. 7C illustrates a laptop personal computer which includes a main body 2201, a casing 2202, a display portion 2203, a keyboard 2204, an external connection port 2205, a pointing device 2206, and the like. The present invention can be applied to the display portion 2203.

Figure 7D:
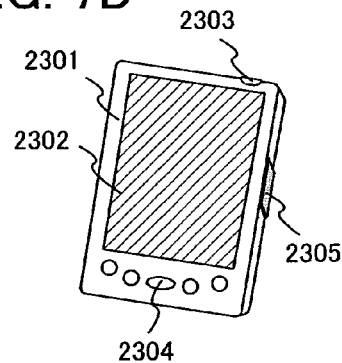

FIG. 7D illustrates a mobile computer which includes a main body 2301, a display portion 2302, a switch 2303, operation keys 2304, an infrared ray port 2305, and the like. The present invention can be applied to the display portion 2302.

Figure 7E:
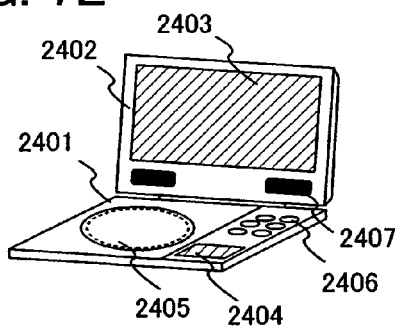

FIG. 7E illustrates a portable image reproducing device equipped with a recording medium (specifically, a DVD player). The device includes a main body 2401, a casing 2402, a display portion A 2403, a display portion B 2404, a recording medium (such as DVD) reading unit 2405, operation keys 2406, speaker units 2407, and the like. The display portion A 2403 mainly displays image information whereas the display portion B 2404 mainly displays text information. The present invention can be applied to the display portions A 2403 and B 2404. Note that the term "image reproducing device equipped with a recording medium" includes home-use game machines and the like.

Figure 7F:
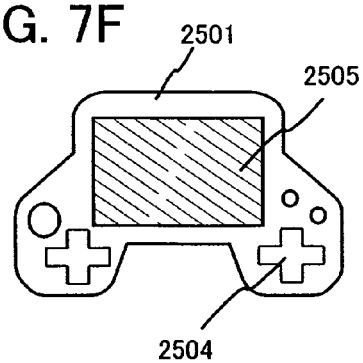

FIG. 7F illustrates a game machine which includes a main body 2501, a display portion 2502, operation switches 2504, and the like.

Figure 7G:
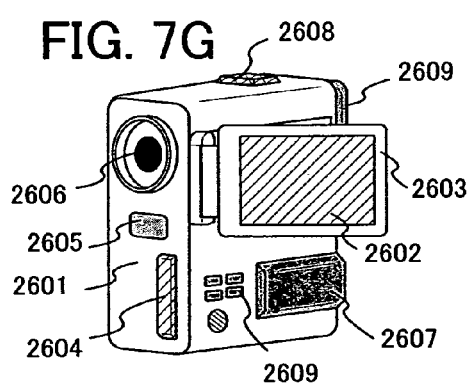

FIG. 7G illustrates a video camera which includes a main body 2601, a display portion 2602, a casing 2603, an external connection port 2604, a remote control receiving unit 2605, an image receiving unit 2606, a battery 2607, an audio input unit 2608, operation keys 2609, and the like. The present invention can be applied to the display portion 2602.

Figure 7H:
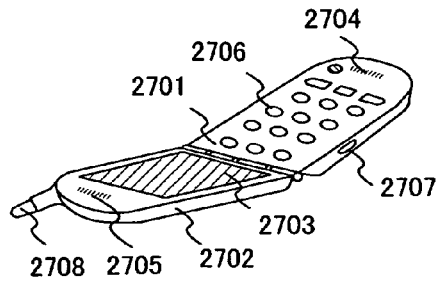

FIG. 7H illustrates a mobile phone which includes a main body 2701, a casing 2702, a display portion 2703, an audio input unit 2704, an audio output unit 2705, operation keys 2706, an external connection port 2707, an antenna 2708, and the like. The present invention can be applied to the display portion 2703.

As described above, the display device obtained by implementing the present invention may be used as the display portions of various electronic devices. The electronic devices of this embodiment may be manufactured using a liquid crystal display device which uses any structures of Embodiment Modes 1 to 3, and Embodiments 1 and 2.

According to the present invention, it becomes possible to manufacture a liquid crystal display device of which use efficiency of liquid crystal materials is high, and the disordered orientation of the liquid crystal molecules is suppressed by attachment of the substrates under reduced pressure, which is suitable for manufacturing a plurality of panels from one substrate.

This application is based on Japanese Patent Application Serial No. 2007-119324 filed with Japan Patent Office on Apr. 27, 2007, the entire contents of which are hereby incorporated by reference.

What is claimed is:

1. A method for manufacturing a liquid crystal display device, comprising the steps of:
    setting a cutting depth of a scribing apparatus for scribing at least one of a pair of substrates before attaching the pair of substrates to each other;
    scribing at least one of the pair of substrates after setting;
    forming a sealant over one of the pair of substrates after scribing;
    dripping liquid crystal to a region surrounded by the sealant after forming the sealant;
    attaching the pair of substrates to each other under reduced pressure after scribing; and
    dividing the pair of substrates along a band-like region which is formed by the scribing.

2. The method for manufacturing a liquid crystal display device according to claim 1, wherein the pair of substrates are glass substrates or quartz substrates.

3. The method for manufacturing a liquid crystal display device according to claim 1, wherein the cutting depth of the scribing apparatus is two-sevenths or more and less than five-sevenths of a thickness of the substrate.

4. A method for manufacturing a liquid crystal display device, comprising the steps of:
    forming a groove on at least one of a pair of substrates;
    forming a sealant over one of the pair of substrates after forming the groove;
    dripping liquid crystal to a region surrounded by the sealant after forming the sealant;
    attaching the pair of substrates to each other under reduced pressure after forming the groove; and
    dividing the pair of substrates along the groove after attaching the pair of substrates to each other.

5. The method for manufacturing a liquid crystal display device according to claim 4, wherein the pair of substrates are glass substrates or quartz substrates.

6. The method for manufacturing a liquid crystal display device according to claim 4, wherein a depth of the groove is two-sevenths or more and less than five-sevenths of a thickness of the substrate.

* * * * *